United States Patent
Takaoka (10) Patent No.: US 9,207,674 B2
(45) Date of Patent: Dec. 8, 2015

(54) AUTONOMOUS MOVING ROBOT AND CONTROL METHOD THEREOF

(71) Applicant: TOYOTA JIDOSHA KABUSHIKI KAISHA, Toyota-shi, Aichi-ken (JP)

(72) Inventor: Yutaka Takaoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/631,326

(22) Filed: Feb. 25, 2015

(65) Prior Publication Data

US 2015/0253774 A1      Sep. 10, 2015

(30) Foreign Application Priority Data

Mar. 6, 2014   (JP) .................................. 2014-044330

(51) Int. Cl.
  *G01C 22/00*   (2006.01)
  *G05D 1/00*    (2006.01)
(52) U.S. Cl.
  CPC .................................... *G05D 1/0088* (2013.01)
(58) Field of Classification Search
  None
  See application file for complete search history.

(56) References Cited

U.S. PATENT DOCUMENTS

2008/0294288 A1* 11/2008 Yamauchi ...................... 700/258
2014/0190514 A1*  7/2014 Lamon et al. ...................... 134/6
2014/0361077 A1* 12/2014 Davidson ...................... 235/385
2015/0019013 A1*  1/2015 Rose et al. ...................... 700/258

FOREIGN PATENT DOCUMENTS

JP       2005-157689 A      6/2005

* cited by examiner

*Primary Examiner* — Adam Alharbi
(74) *Attorney, Agent, or Firm* — Oliff PLC (57) ABSTRACT

An autonomous moving robot includes: a distance sensor; an estimation unit configured to estimate a self position based on a distance measured by the distance sensor and map information; a normal line calculating unit configured to calculate a plane based on the distance and calculate the normal line of the plane; and a determination unit configured to calculate a histogram representing a distribution of normal line angles indicating a direction of the normal line and determines whether information of the distance sensor is insufficient based on the calculated histogram. The autonomous moving robot autonomously moves based on the self position estimated. At least one of a control process of changing a measurement direction of the distance sensor, a process of changing an estimation method of the self position, or a control process of taking a predetermined safety action is performed when the determination unit determines that the information is insufficient.

7 Claims, 11 Drawing Sheets

AUTONOMOUS MOVING ROBOT AND CONTROL METHOD THEREOF

INCORPORATION BY REFERENCE

The disclosure of Japanese Patent Application No. 2014-044330 filed on Mar. 6, 2014 including the specification, drawings and abstract is incorporated herein by reference in its entirety.

BACKGROUND OF THE INVENTION

1. Field of the Invention

The present invention relates to an autonomous moving robot that estimates a self position and autonomously moves on the basis of the estimated self position and a control method thereof.

2. Description of Related Art

An autonomous moving object is known which estimates a self position on the basis of a distance measured by a distance sensor (Japanese Unexamined Patent Application Publication No. 2005-157689 (JP 2005-157689 A)).

Figure 2:
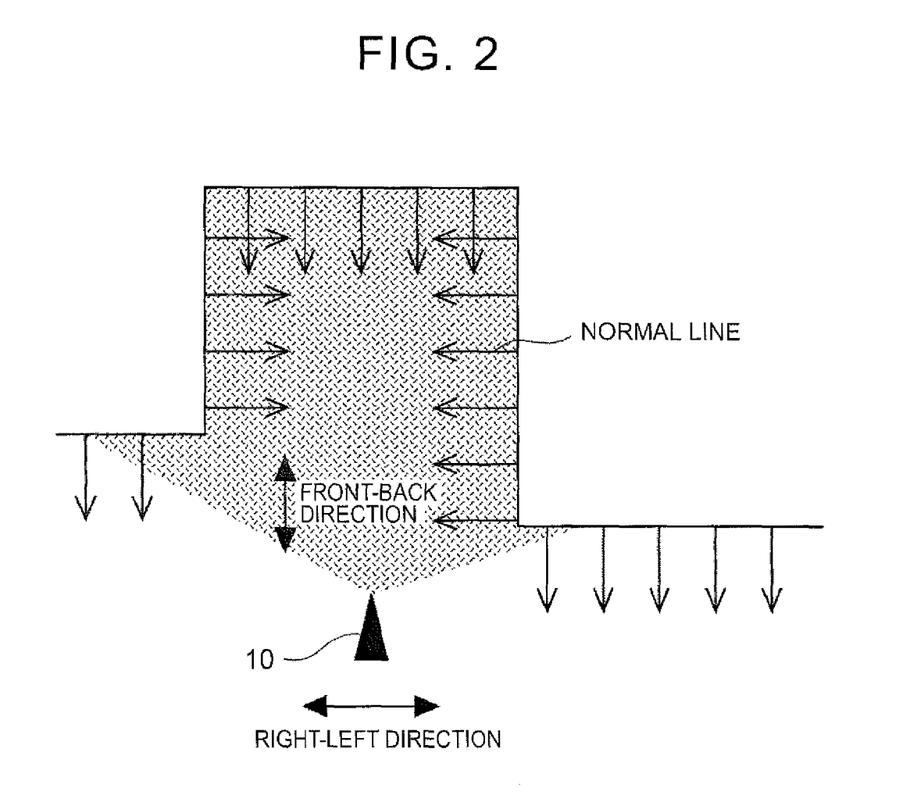
FIG. 2 is a diagram illustrating a case in which a self position is estimated on the basis of distance information obtained by measuring perpendicular walls.

For example, when an autonomous moving object 10 moves in an environment in which walls perpendicular to each other are present as illustrated in FIG. 2, relative positions in the front-back direction and the right-left direction are determined. Accordingly, the autonomous moving object 10 can estimate a self position with high accuracy.

Figure 3:
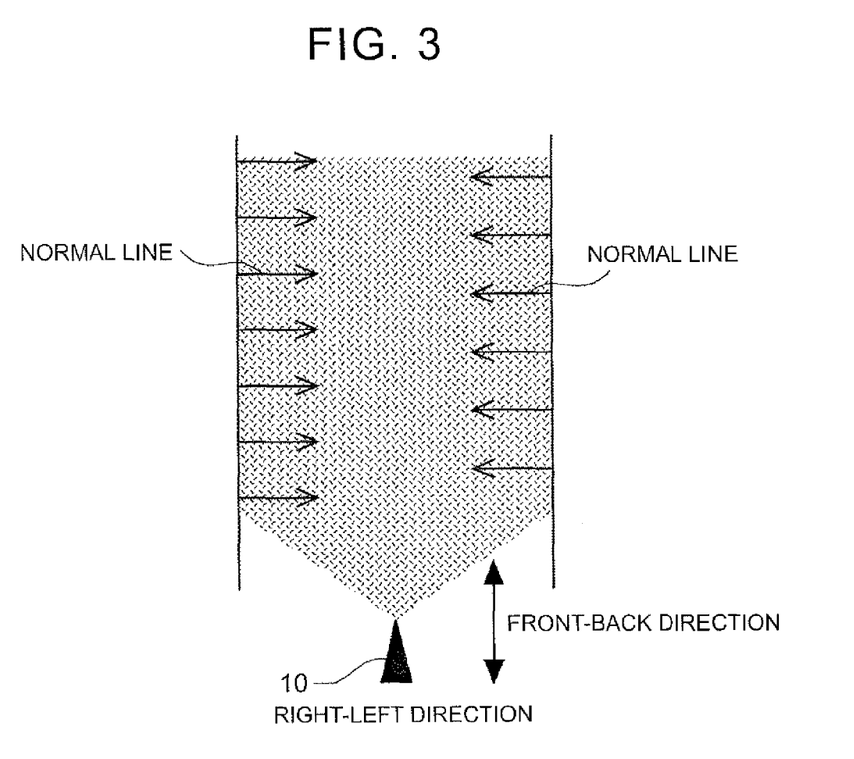
FIG. 3 is a diagram illustrating a case in which a self position is estimated on the basis of distance information obtained by measuring walls in only one direction such as a passage.

On the other hand, when the autonomous moving object 10 moves in an environment in which walls are present in only one direction as illustrated in FIG. 3, the relative position in the right-left direction is determined but the relative position in the front-back direction is not determined. In this way, when distance information of the distance sensor is biased in one direction and is thus insufficient, there is a possibility that a self position estimation error will become greater.

SUMMARY OF THE INVENTION

The invention provides an autonomous moving robot that can enhance estimation accuracy of a self position and improve safety and a control method thereof.

According to an aspect of the invention, there is provided an autonomous moving robot. The autonomous moving robot includes: a distance sensor that measures a distance to an object; an estimation unit configured to estimate a self position based on the distance measured by the distance sensor and map information indicating a movement environment of the autonomous moving robot; a normal line calculating unit configured to calculate a plane based on the distance measured by the distance sensor and calculate the normal line of the plane; and a determination unit configured to calculate a histogram representing a distribution of normal line angles indicating a direction of the normal line calculated by the normal line calculating unit and determine whether information of the distance sensor for estimating the self position is insufficient based on the calculated histogram. The autonomous moving robot autonomously moves based on the self position estimated by the estimation unit. At least one of a control process of changing a measurement direction of the distance sensor, a process of changing an estimation method of the self position, or a control process of taking a predetermined safety action is performed when the determination unit determines that the information of the distance sensor is insufficient.

According to this aspect, when the information of the distance sensor is insufficient, the information volume of the distance sensor is increased by performing the control process of changing the measurement direction of the distance sensor and the influence of an error of the distance sensor is suppressed by changing the estimation method of the self position, whereby it is possible to enhance the estimation accuracy of the self position. It is also possible to improve safety by performing the control process of taking a predetermined safety action.

In the aspect in which the estimation accuracy of a self position can be enhanced and the safety can be improved, the determination unit may determine that the information of the distance sensor for estimating the self position is insufficient when a frequency peak of the normal line angles having an orthogonal relationship is not present in the calculated histogram, a plurality of frequency peaks of the normal line angles is not uniformly present in the calculated histogram, and the normal line angles are not uniformly distributed in the calculated histogram.

According to this aspect, it is possible to easily primarily determine that the information volume of the distance sensor is insufficient and it is thus possible to take countermeasures such as the control process of changing the measurement direction of the distance sensor, the process of changing the estimation method of the self position, and the control process of taking a predetermined safety action on the basis of the primary determination.

In the aspect, the estimation unit may calculate a plurality of estimated position candidates estimated to be the self position based on the distances measured by the distance sensor, may estimate the position extracted from the calculated estimated position candidates to be the self position, and may increase the number of estimated position candidates in the direction perpendicular to a peak normal line angle in the histogram when the determination unit determines that the information of the distance sensor is insufficient.

According to this aspect, it is possible to enhance the estimation accuracy of the self position in the perpendicular direction in which the relative position is not determined.

In the aspect, at least one of the control process of changing the measurement direction of the distance sensor, the process of changing the estimation method of the self position, or the control process of taking the predetermined safety action may be performed when a state in which the determination unit determines that the information of the distance sensor is insufficient is maintained for a predetermined amount of time or more.

According to this aspect, it is possible to rapidly cope with an estimation error of the self position which is enlarged because the state in which the information of the distance sensor is not sufficient is maintained for a predetermined amount of time or more.

In the aspect, the autonomous moving robot may further include a control unit configured to perform the control process of changing the measurement direction of the distance sensor so as to generate a frequency peak of the normal line angles having an orthogonal relationship in the histogram and a control process of taking a predetermined safety action of decelerating and stopping the autonomous moving robot or giving a warning.

By performing the control process of changing the measurement direction of the distance sensor and the process of changing the estimation method of the self position so as to compensate for the insufficiency of the information of the distance sensor, it is possible to enhance the estimation accuracy of the self position. By decelerating and stopping the autonomous moving robot or giving a warning before the self position is lost, it is possible to suppress the loss of the self position.

In the aspect, the autonomous moving robot may further include: a vehicle wheel that allows the autonomous moving robot to move; a rotation detecting unit that detects rotation information of the vehicle wheel; and an image acquiring unit that acquires image information around the autonomous moving robot. The estimation unit may estimate the self position based on a first estimation method of estimating the self position using an odometry method based on the distance measured by the distance sensor and the map information and a second estimation method of estimating the self position using the odometry method based on at least one of the rotation information detected by the rotation detecting unit or the image information acquired by the image acquiring unit, and may set a weighting of the second estimation method to be higher than that of the first estimation method when the determination unit determines that the information of the distance sensor is insufficient. The weighting of the second estimation method is set to be higher than the weighting of the first estimation method so as to decrease the influence of the self position using the first estimation method including the error of the distance sensor and to increase the influence of the self position using the second estimation method not including the error of the distance sensor.

According to this aspect, it is possible to reduce the influence of the error due to the distance sensor and to estimate the self position with high accuracy.

According to another aspect of the invention, there is provided a control method of an autonomous moving robot including a distance sensor that measures a distance to an object and an estimation unit configured to estimate a self position based on the distance measured by the distance sensor and map information indicating a movement environment of the autonomous moving robot and autonomously moving based on the self position estimated by the estimation unit. The control method of an autonomous moving robot includes: calculating a plane based on the distance measured by the distance sensor and calculating the normal line of the plane; calculating a histogram representing a distribution of normal line angles indicating a direction of the calculated normal line and determining whether information of the distance sensor for estimating the self position is insufficient based on the calculated histogram; and performing at least one of a control process of changing a measurement direction of the distance sensor, a process of changing an estimation method of the self position, or a control process of taking a predetermined safety action when it is determined that the information of the distance sensor is insufficient.

According to the aspects of the invention, it is possible to provide an autonomous moving robot that can enhance estimation accuracy of a self position and improve safety and a control method thereof.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
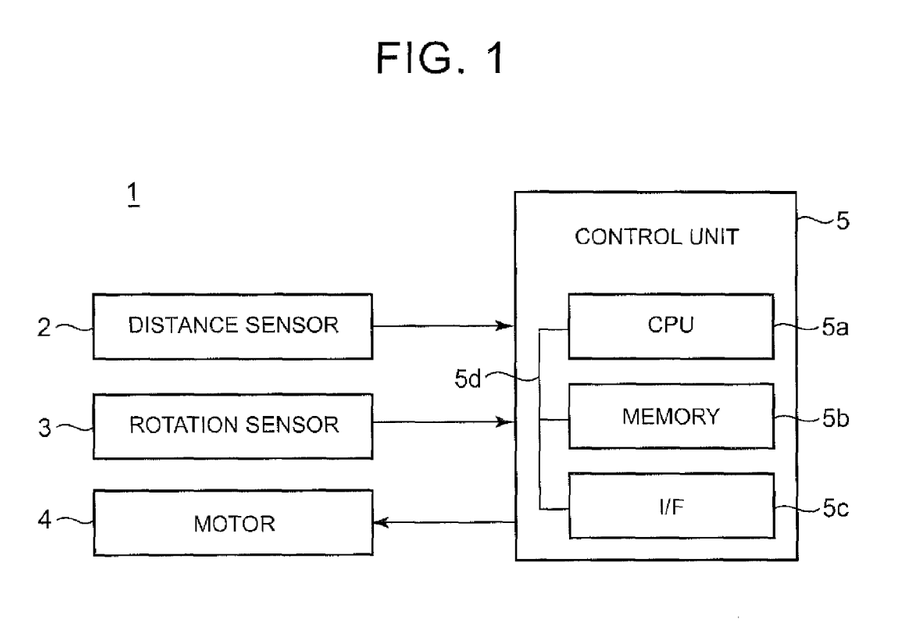
FIG. 1 is a block diagram schematically illustrating a system configuration of an autonomous moving robot according to an embodiment of the invention.

Hereinafter, an embodiment of the invention will be described with reference to the accompanying drawings. An autonomous moving robot according to an embodiment of the invention estimates a self position with high accuracy and autonomously moves on the basis of the estimated self position. FIG. 1 is a block diagram schematically illustrating a system configuration of the autonomous moving robot according to this embodiment. The autonomous moving robot 1 according to this embodiment includes a distance sensor 2 that measures a distance to an object, a rotation sensor 3 that detects rotation information of vehicle wheels, a motor 4 that rotationally drives the vehicle wheels, and a control unit 5 that controls the motor 4.

The distance sensor 2 measures distances to objects (plural measurement points) such as road surfaces, wall surfaces, and obstacles in a movement environment in which the autonomous moving robot 1 moves. The distance sensor 2 is, for example, a laser sensor or an ultrasonic sensor, and is attached to an autonomous moving robot body so as to face the road surface in the traveling direction of the autonomous moving robot 1. The distance sensor 2 is, for example, a two-dimensional distance sensor that emits a laser beam in the horizontal direction to scan the movement environment by fluctuation. The distance sensor 2 outputs the measured distance information to the control unit 5.

The rotation sensor 3 detects rotation information (such as rotation angle, rotational angular velocity, and rotational angular acceleration) of vehicle wheels which allows the autonomous moving robot 1 to move, and outputs the detected rotation information to the control unit 5. The motor 4 rotationally drives the vehicle wheels in accordance with a control signal from the control unit 5.

The control unit 5 controls the motor 4 on the basis of the distance information output from the distance sensor 2 and the rotation information output from the rotation sensor 3 so as to allow the autonomous moving robot 1 to autonomously move.

The control unit 5 is constituted, in hardware, by a microcomputer including a central processing unit (CPU) 5a performing control processes, arithmetic operations, and the like, a memory 5b including a read only memory (ROM) or a random access memory (RAM) in which control programs, arithmetic programs, and the like executed by the CPU 5a are stored, an interface unit (I/F) 5c for inputting and outputting signals with respect to the outside. The CPU 5a, the memory 5b, and the interface unit 5c are connected to each other via a data bus 5d or the like.

When a self position is estimated with high accuracy on the basis of the distance information measured by the distance sensor, it is necessary to estimate the self position on the basis of sufficient distance information. For example, as illustrated in FIG. 2, when an autonomous moving object 10 estimates a self position on the basis of distance information obtained by measuring walls perpendicular to each other, the relative positions in the front-back direction and the right-left direction are determined. In this way, when the distance information of the distance sensor is sufficient, it is possible to estimate the self position with high accuracy. On the other hand, as illustrated in FIG. 3, when an autonomous moving object 10 estimates a self position on the basis of distance information obtained by measuring walls in only one direction such as a passage, the relative position in the right-left direction is determined but the relative position in the front-back direction is not determined. In this way, when the distance information of the distance sensor is biased in one direction and is insufficient, the estimation error of the self position increases and, for example, there is a possibility that the self position will be lost.

On the contrary, the autonomous moving robot 1 according to this embodiment performs at least one of a control process of changing the measurement direction of the distance sensor 2, a process of changing the estimation method of the self position, and a control process of taking a predetermined safety action, when it is determined that the information of the distance sensor 2 is insufficient.

Accordingly, when the information of the distance sensor 2 is insufficient, the information volume of the distance sensor 2 is increased by performing the control process of changing the measurement direction of the distance sensor 2 and the influence of an error of the distance sensor 2 is suppressed by changing the estimation method of the self position, whereby it is possible to enhance the estimation accuracy of the self position. It is also possible to improve safety by performing the control process of taking a predetermined safety action.

That is, in order to estimate the self position from the measurement data of the distance sensor 2 with high accuracy, it can be primarily determined whether the information of the distance sensor 2 is insufficient. When it is determined that the information of the distance sensor 2 is insufficient, it is possible to enhance the estimation accuracy of the self position by performing the control process of changing the measurement direction of the distance sensor 2 or the process of changing the estimation method of the self position so as to compensate for the insufficiency. By performing the control process of taking a predetermine safety action before the self position is lost, it is possible to suppress the loss of the self position.

Figure 4:
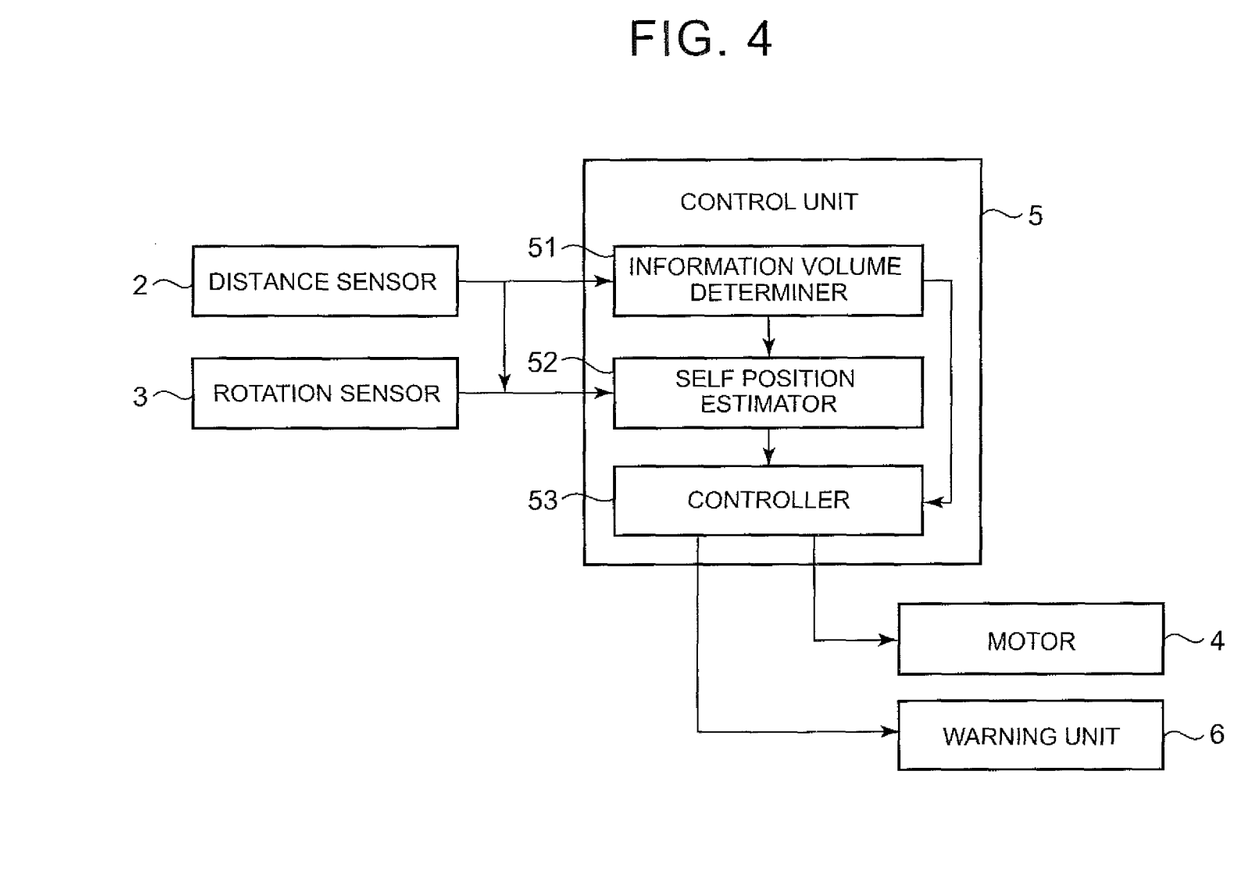
FIG. 4 is a block diagram schematically illustrating a system configuration of a control unit according to the embodiment of the invention.

FIG. 4 is a block diagram schematically illustrating a system configuration of the control unit according to this embodiment. The control unit 5 according to this embodiment includes an information volume determiner 51 that determines whether the information volume of the distance sensor 2 for estimating the self position is insufficient, a self position estimator 52 that estimates the self position, and a controller 53 that controls the motor 4 on the basis of the estimated self position.

Figure 5:
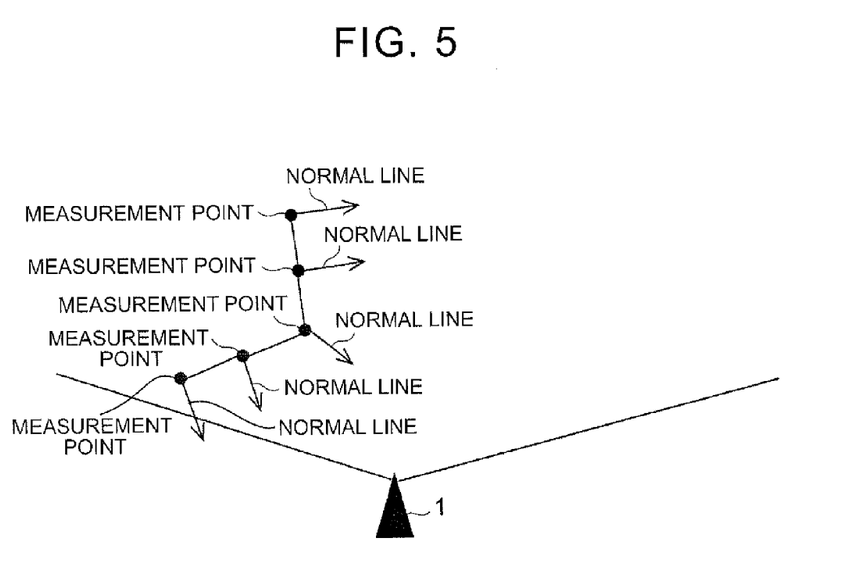
FIG. 5 is a diagram illustrating directions of calculated normal lines.

The information volume determiner 51 is a specific example of the normal line calculating unit and the determination unit and serves to calculate a plane on the basis of the distances measured by the distance sensor 2 and to calculate the normal line of the plane (FIG. 5). The information volume determiner 51 calculates planes including plural (for example, three) neighboring measurement points on the basis of the distances measured by the distance sensor 2 and calculates the normal lines of the calculated planes. The information volume determiner 51 calculates the normal lines at the measurement points at which the distance is measured by the distance sensor 2 and calculates a histogram representing the numbers of normalizes (frequency) which are present in the normal line directions (normal line angles). The information volume determiner 51 extracts a normal line angle (peak normal line angle) at which the frequency is a peak from the calculated histogram. The information volume determiner 51 determines (1) whether peak normal line angles having an orthogonal relationship are present, (2) whether plural peak normal line angles are uniformly present, or (3) whether the normal line angles are uniformly distributed, in the calculated histogram.

(1)

Figure 6:
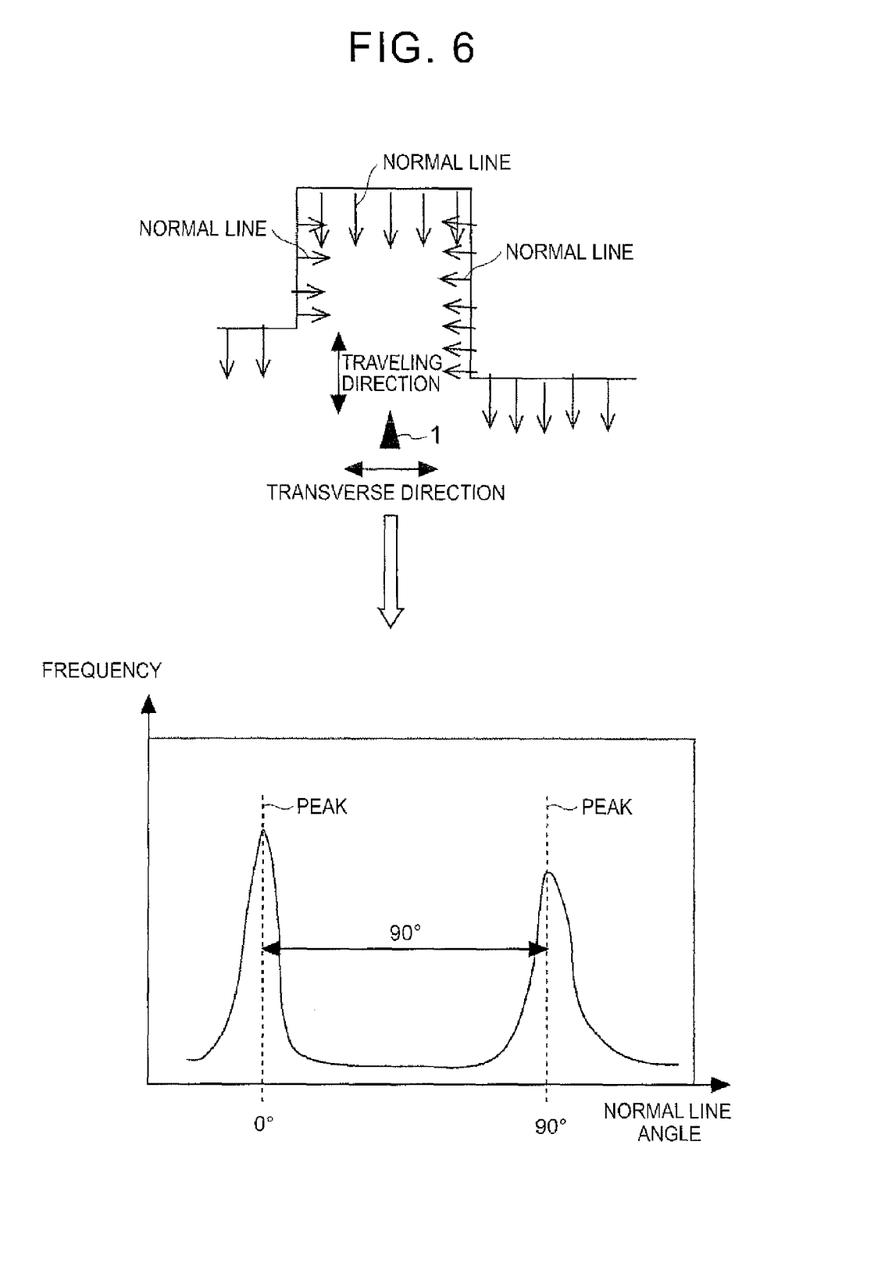
FIG. 6 is a diagram illustrating peak normal line angles having an orthogonal relationship.

As illustrated in FIG. 6, in a movement environment in which perpendicular walls are present, the difference between the neighboring peak normal line angles in the histogram is 90° and the peak normal line angles have an orthogonal relationship. In this case, since the relative position relationship is determined in the front-back direction and the right-left direction, the estimation accuracy of the self position is high.

(2)

Figure 7:
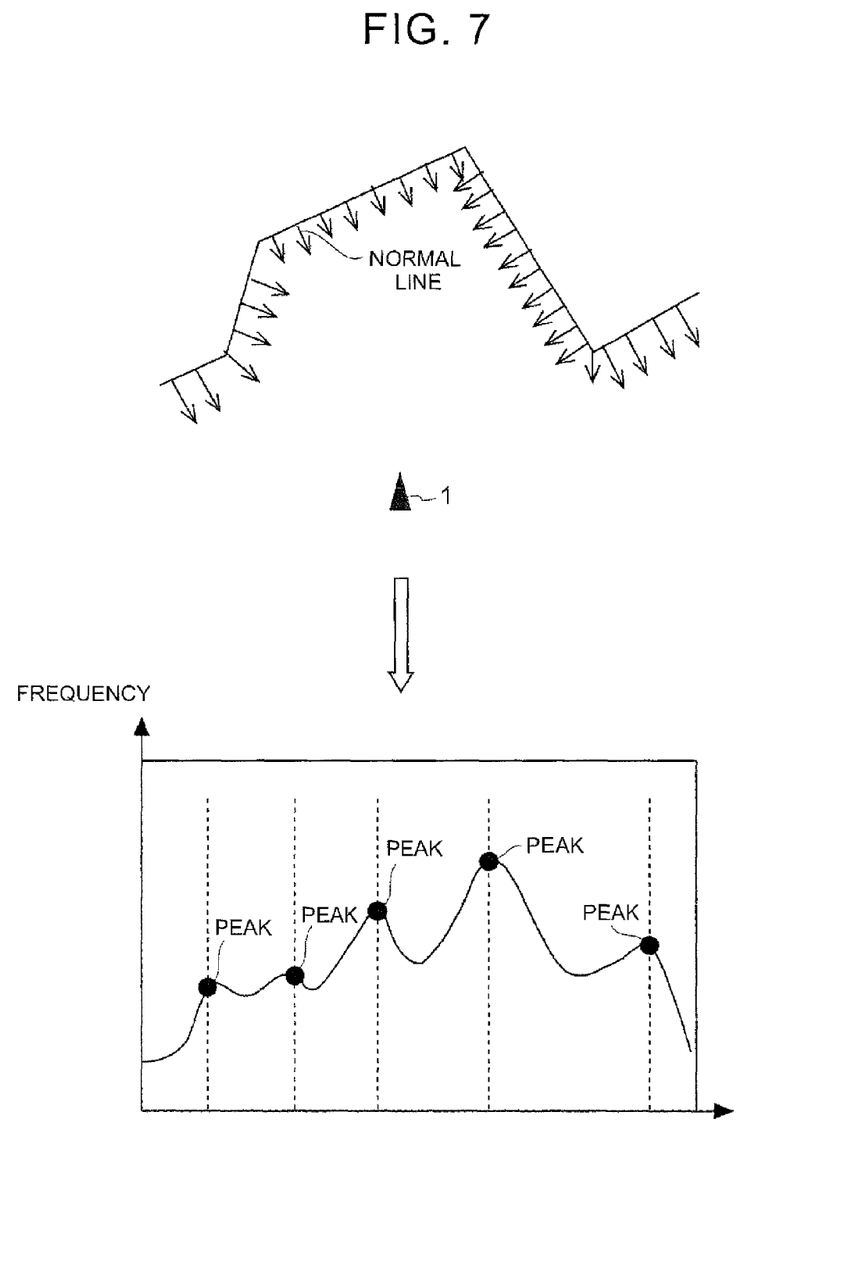
FIG. 7 is a diagram illustrating a case in which plural peak normal line angles are uniformly present.

As illustrated in FIG. 7, in a movement environment in which plural walls are present (but orthogonal walls are not present) at substantially-equal angles, plural peak normal line angles are uniformly present in the histogram. In this case, since the relative position relationship is determined in plural directions, the estimation accuracy of the self position is high.

(3)

Figure 8:
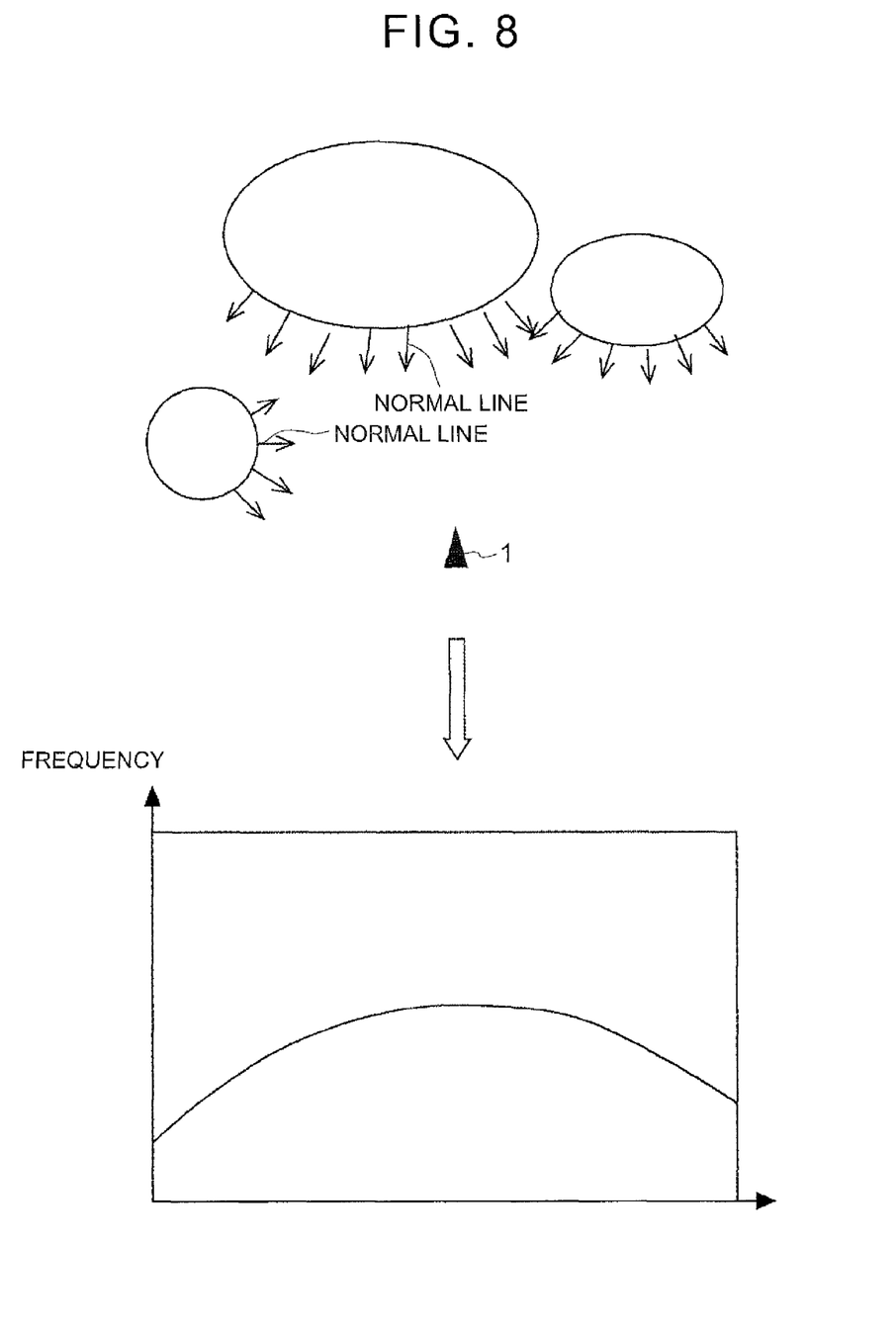
FIG. 8 is a diagram illustrating a case in which normal line angles are uniformly distributed.

As illustrated in FIG. 8, in a movement environment in which a lot of freely-curved surfaces are present, a peak normal line angle is not present, but normal lines at all the normal line angles are uniformly present and the normal line angles are uniformly distributed. In this case, since the relative position relationship is determined in plural directions, the estimation accuracy of the self position is high. The information volume determiner 51 determines that the information of the distance sensor 2 for estimating the self position is sufficient (not insufficient), when the histogram is in the states of (1) to (3).

When it is determined that the histogram satisfies the states of (1) to (3) and the information of the distance sensor 2 for estimating the self position is sufficient, the information volume determiner 51 outputs a first signal indicating that fact to the self position estimator 52.

On the other hand, for example, when peak normal line angles having an orthogonal relationship are not present in the histogram, plural peak normal line angles are not uniformly present in the histogram, or the normal line angles are not uniformly distributed in the histogram, in the calculated histogram (the histogram are not in the states of (1) to (3)), the information volume determiner 51 determines that the information of the distance sensor 2 for estimating the self position is insufficient.

Figure 9:
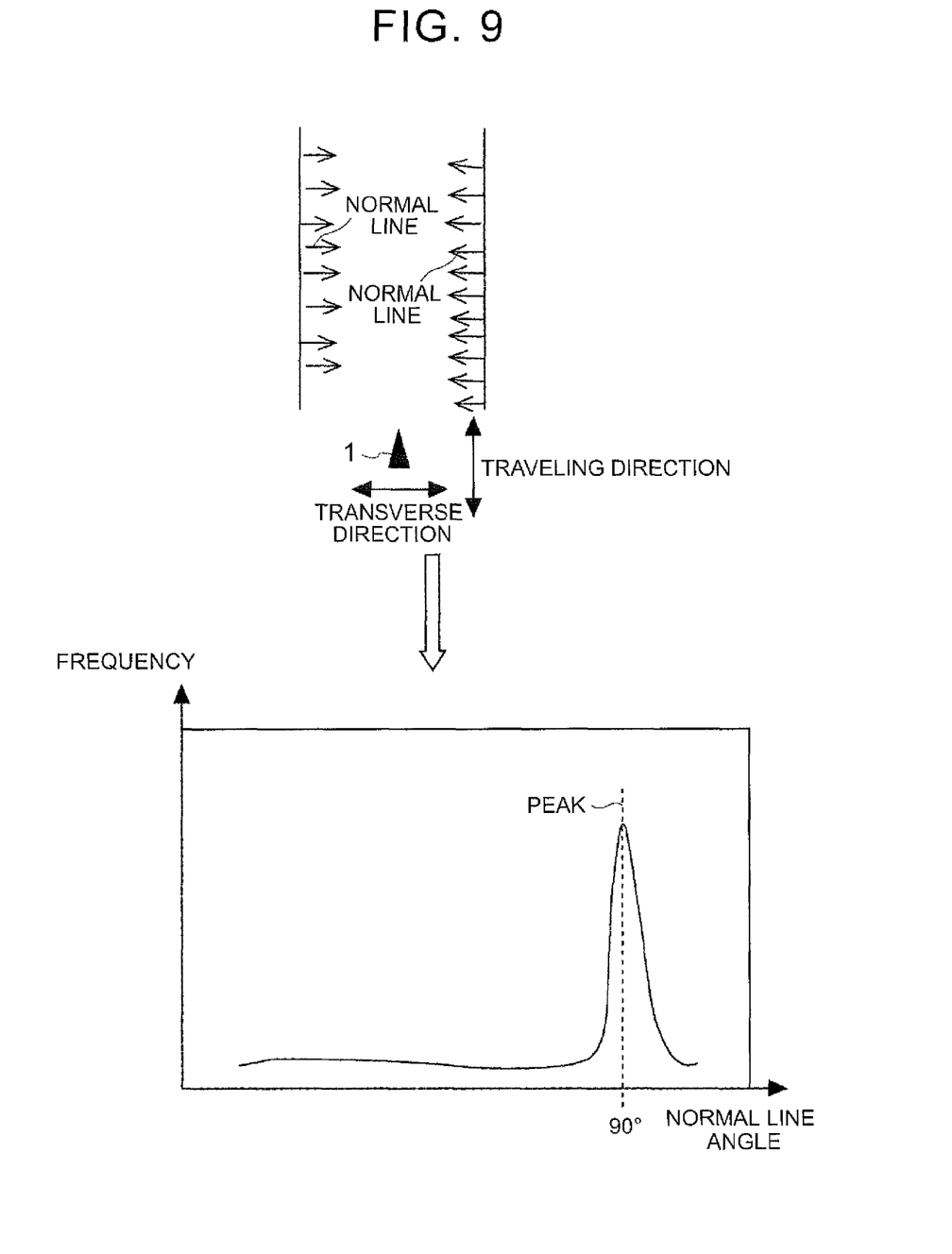
FIG. 9 is a diagram illustrating a case in which only one peak normal line angle is present.

As illustrated in FIG. 9, in a movement environment in which walls in only one direction are present, only one peak normal line angle is present in the histogram. In this case, the relative position is determined in the direction of the peak normal line angle, but the relative position is not determined in other directions. Accordingly, the estimation error of the self position increases. The information volume determiner 51 determines that the information of the distance sensor 2 is insufficient when it is determined that the histogram is not in the states of (1) to (3). When the histogram is not in the states of (1) to (3) and it is determined that the information of the distance sensor 2 is insufficient, the information volume determiner 51 outputs a second signal indicating that fact to the controller 53.

In this way, by determining whether the histogram is in the states of (1) to (3), it is possible to easily determine whether a characteristic shape necessary for estimating the relative position of the autonomous moving robot 1 is present in the movement environment, for example, even when the distance sensor 2 with a narrow field of vision.

The self position estimator 52 is a specific example of the estimation unit and estimates the self position of the autonomous moving robot 1 using an odometry method on the basis of the distance information output from the distance sensor 2 and the map information representing the movement environment of the autonomous moving robot 1. The self position estimator 52 estimates the self position by performing a matching process or the like, for example, on the basis of the map information representing a predetermined two-dimensional environment, the distance information measured by the distance sensor 2, and the rotation information of the vehicle wheels measured by the rotation sensor 3. For example, the map information is stored in advance in the memory 5b. The self position estimator 52 may estimate the self position without using the odometry method on the basis of the information detected by a sensor of the autonomous moving robot 1.

The self position estimator 52 performs a normal self position estimating process on the basis of the distance information of the distance sensor 2 when it is determined that the information of the distance sensor 2 is sufficient on the basis of the first signal output from the information volume determiner 51. In this case, since the distance information output from the distance sensor 2 includes information for accurately determining the relative position relationship, the self position estimator 52 can estimate the self position with high accuracy on the basis of the distance information of the distance sensor 2.

On the other hand, for example, the self position estimator 52 changes the estimation method of the self position when it is determined that the information of the distance sensor 2 is insufficient on the basis of the second signal output from the information volume determiner 51.

Here, the self position estimator 52 calculates plural candidates (hereinafter, estimated position candidates) of the position which is estimated to be the self position using the odometry method on the basis of the distance info nation measured by the distance sensor 2 and the rotation information of the vehicle wheels measured by the rotation sensor 3. The self position estimator 52 estimates a position finally extracted from the plural calculated estimated position candidates to be the self position.

The self position estimator 52 calculates plural estimated position candidates by adjusting an estimation parameter. The estimation parameter is an error parameter indicating an error (differences in the traveling direction, the transverse direction, and the angle direction) from an estimated position when the position after movement by a predetermined distance is estimated.

In the example illustrated in FIG. 9, the relative position is determined in a direction in which the frequency of the histogram is high (for example, the transverse direction), but the relative position is not determined in the direction (for example, the traveling direction) perpendicular thereto. Therefore, the self position estimator 52 adjusts the estimation parameter of the self position so as to increase the number of estimated position candidates in the direction (traveling direction) in which the position is not determined.

In this case, the self position estimator 52 increases the number of estimated position candidates in the traveling direction by increasing the error parameter in the traveling direction. Specifically, the self position estimator 52 increases the number of estimated position candidates in the directions (perpendicular direction) of ±90° of the peak normal line angle (90°) of the histogram. In this way, by increasing the number of estimated position candidates in the direction in which the relative position is not determined, it is possible to enhance the estimation accuracy of the self position in the direction in which the relative position is not determined.

While the self position estimator 52 is adjusting the estimation parameter, the autonomous moving robot 1 moves and the movement environment is also changed. Accordingly, for example, when the movement environment is changed to the movement environments illustrated in FIGS. 6 to 8, the self position estimator 52 can estimate the self position with higher accuracy using the optimally-adjusted estimation parameter.

When the histogram is not in the states of (1) to (3) and it is determined that the state in which the information of the distance sensor is insufficient is maintained for a predetermined amount of time or more, the information volume determiner 51 outputs a third signal indicating that fact to the controller 53. The controller 53 performs at least one of (A) a control process of changing the measurement direction of the distance sensor 2, (B) a process of changing the estimation method of the self position, and (C) a control process of taking a predetermined safety action on the basis of the third signal output from the information volume determiner 51.

(A)

The controller 53 performs the control process of changing the measurement direction of the distance sensor 2 on the basis of the third signal output from the information volume determiner 51. When the state in which the information of the distance sensor 2 for estimating the self position is insufficient is maintained for a predetermined amount of time or more, the estimation error of the self position increases and thus rapid improvement is necessary. Accordingly, the controller 53 actively changes the measurement direction of the distance sensor 2 and searches for the environment in which the information of the distance sensor 2 is sufficient, for example, as illustrated in FIGS. 6 to 8. The controller 53 changes the measurement direction of the distance sensor 2, for example, by controlling the motor 4 so as to perform a control process of turning (rotating) the autonomous moving robot 1 or to perform a control process of rotating the head or the body provided with the distance sensor 2 about a yaw axis.

The controller 53 may directly change the measurement direction of the distance sensor 2 by driving an actuator or the like to rotationally drive the distance sensor 2. The controller 53 performs the control process of changing the measurement direction of the distance sensor 2, for example, until the histogram enters the states of (1) to (3). Accordingly, the information of the distance sensor 2 becomes sufficient and thus the self position estimator 52 can estimate the self position with high accuracy.

(B)

The self position estimator 52 performs the process of changing the estimation method of the self position on the basis of the third signal output from the information volume determiner 51. The self position estimator 52 estimates the self position, for example, using a first estimation method of estimating the self position on the basis of the distances measured by the distance sensor 2 and a second estimation method of estimating the self position on the basis of the rotation information detected by the rotation sensor 3.

More specifically, the self position estimator 52 estimates the self position using the odometry method on the basis of the map information and the distance information measured by the distance sensor 2 by using the first estimation method. The self position estimator 52 estimates the self position using the odometry method on the basis of the rotation information of the vehicle wheels measured by the rotation sensor 3 by using the second estimation method. The self position estimator 52 estimates the final self position by multiplying a predetermined weighting (coefficient) by the self position estimated using the first estimation method and the self position estimated using the second estimation method.

When the information of the distance sensor 2 is insufficient, the self position estimated using the first estimation method of estimating the self position on the basis of the distance information measured by the distance sensor 2 includes a great error. On the other hand, the self position estimated using the second estimation method of estimating the self position on the basis of the rotation information of the vehicle wheels measured by the rotation sensor 3 is not affected by the error of the distance sensor 2 and has higher accuracy.

Therefore, the self position estimator 52 sets the weighting of the second estimation method to be higher than the weighting of the first estimation method so as to decrease the influence of the self position based on the first estimation method and to increase the influence of the self position based on the second estimation method. Accordingly, the self position estimator 52 can decrease the influence of the error of the distance sensor 2 and can estimate the self position with high accuracy.

When the information of the distance sensor 2 is insufficient, the self position estimator 52 may stop the estimating of the self position using the first estimation method and may perform the estimating of the self position using the second estimation method. As the second estimation method, the self position estimator 52 may estimate the self position using the odometry method, for example, on the basis of image information captured by a camera. The self position estimated on the basis of the image information of the camera is not affected by the error of the distance sensor 2 and has higher accuracy. The self position estimator 52 may estimate the self position using the odometry method on the basis of the image captured by the camera and the rotation information measured by the rotation sensor 3.

(C)

The controller 53 performs the control process of taking a predetermined safety action on the basis of the third signal output from the information volume determiner 51. When the state in which the information of the distance sensor 2 for estimating the self position is insufficient is maintained for a predetermined amount of time or more, the estimation error of the self position is great and there is a possibility that the self position will be lost. Therefore, the controller 53 may perform the control process of taking a predetermined safety action.

For example, the controller 53 stops the estimating of the self position by the self position estimator 52 and controls the motor 4 so as to perform the control process of decelerating and stopping the autonomous moving robot 1. The controller 53 may give a warning to a user using a warning unit 6. Examples of the warning unit 6 include a sound output device that outputs a warning sound, a lighting device that turns on/off a warning lamp, a display device that displays a warning, a vibration device that generates warning vibration, and a communication device that gives a warning to a user at a remote position. Accordingly, even when the state in which the information of the distance sensor 2 is insufficient is maintained and the estimation error of the self position increases, it is possible to guarantee the safety of the autonomous moving robot 1.

Figure 10:
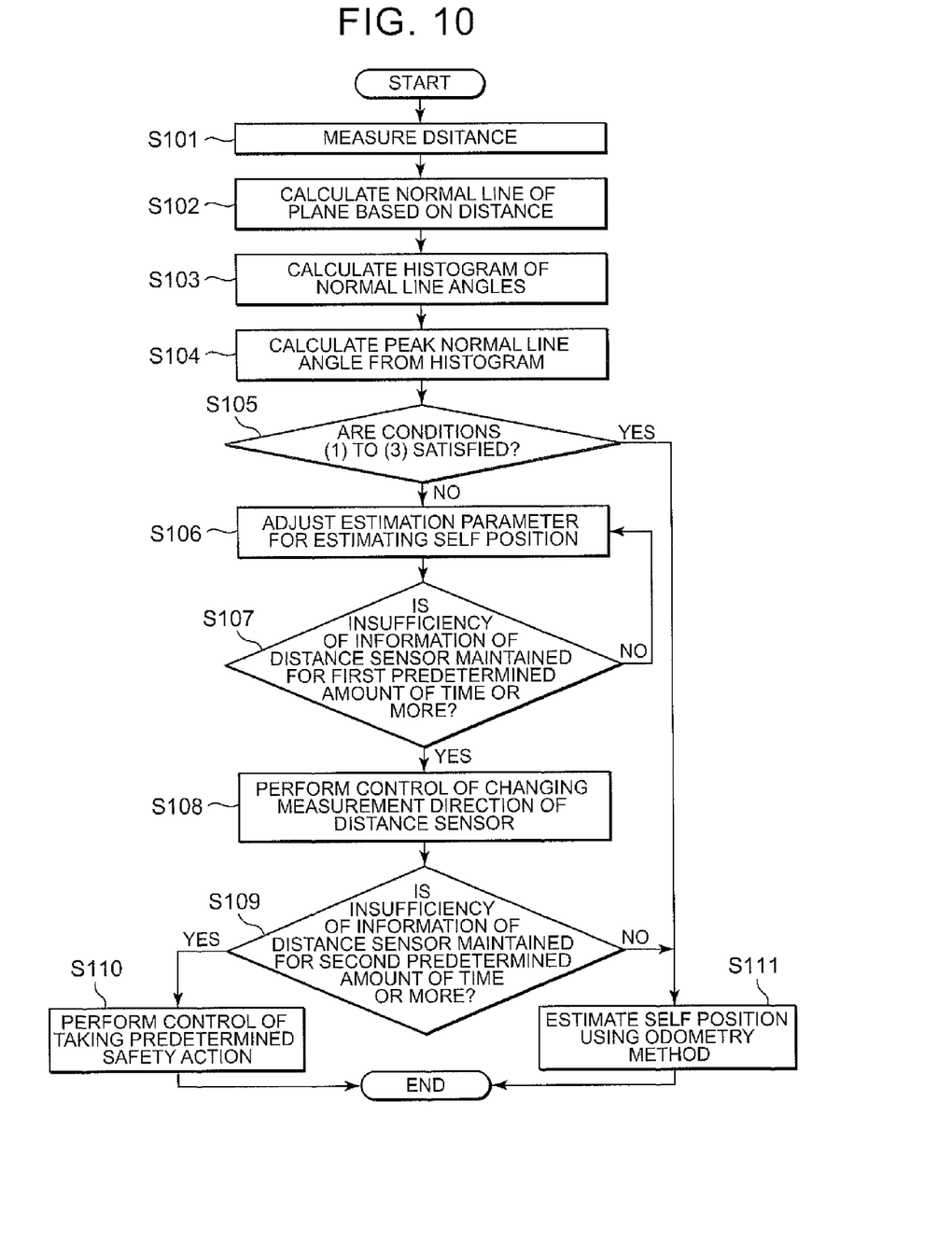
FIG. 10 is a flowchart illustrating a control process flow of a control method of the autonomous moving robot according to the embodiment of the invention.

FIG. 10 is a flowchart illustrating a control process flow of a control method of the autonomous moving robot according to this embodiment. The control process flow illustrated in FIG. 10 is repeatedly performed, for example, every predetermined short time.

The distance sensor 2 measures the distances to objects in the movement environment in which the autonomous moving robot 1 moves (step S101) and outputs the measured distance to the information volume determiner 51 and the self position estimator 52.

The information volume determiner 51 calculates planes including plural neighboring measurement points on the basis of the distances measured by the distance sensor 2 and calculates normal lines of the calculated planes (step S102). The information volume determiner 51 calculates the normal lines at all the measurement points to which the distances are measured by the distance sensor 2 and calculates a histogram of the normal line angles (step S103). The information volume determiner 51 extracts peak normal line angles from the calculated histogram (step S104).

The information volume determiner 51 determines (1) whether peak normal line angles having an orthogonal relationship are present, (2) whether plural peak normal line angles are uniformly present, or (3) whether the normal line angles are uniformly distributed, in the calculated histogram (step S105).

When it is determined (1) that peak normal line angles having an orthogonal relationship are not present, (2) that plural peak normal line angles are not uniformly present, and (3) that the normal line angles are not uniformly distributed, in the calculated histogram (NO in step S105), the information volume determiner 51 determines that the information of the distance sensor 2 for estimating the self position is insufficient. In this case, the self position estimator 52 adjusts the estimation parameter for estimating the self position so as to increase the number of estimated position candidates in the directions of ±90° of the peak normal line angle (90°) in the histogram (step S106).

The information volume determiner 51 determines whether the histogram is not in the stats of (1) to (3) and whether the state in which the information of the distance sensor 2 for estimating the self position is insufficient is maintained for a first predetermined amount of time or more (step S107).

When the information volume determiner 51 determines that the state in which the information of the distance sensor 2 is insufficient is maintained for the first predetermined amount of time or more (YES in step S107), the controller 53 performs (A) the control process of changing the measurement direction of the distance sensor 2 (step S108).

At this time, the controller 53 may not perform (A) the control process of changing the measurement direction of the distance sensor 2, but the self position estimator 52 may perform (B) the process of changing the estimation method of the self position. The controller 53 performs (A) the control process of changing the measurement direction of the distance sensor 2 and the self position estimator 52 may perform (B) the process of changing the estimation method of the self position. The information volume determiner 51 determines whether the state in which the information of the distance sensor 2 is insufficient is maintained for a second predetermined amount of time (second predetermined amount of time>first predetermined amount of time) or more (step S109).

When the information volume determiner 51 determines that the state in which the information of the distance sensor 2 is insufficient is maintained for the second predetermined amount of time or more (YES in step S109), the controller 53 performs (C) the control process of taking a predetermined safety action (step S110). In this way, when a predetermined amount of time elapses after the measurement direction of the distance sensor 2 is changed but the state in which the information of the distance sensor 2 is insufficient is maintained, the estimation error of the self position is great and there is a possibility that the self position will be lost. Accordingly, the loss of the self position is satisfactorily prevented by taking the predetermined safety action. On the other hand, when the information volume determiner 51 determines that the information of the distance sensor 2 is sufficient (NO in step S109), the process flow moves to the following process (step S111).

When (1) peak normal line angles having an orthogonal relationship are present, (2) plural peak normal line angles are uniformly present, or (3) the normal line angles are uniformly distributed, in the calculated histogram (YES in step S105), the information volume determiner 51 determines that the information of the distance sensor 2 for estimating the self position is sufficient. In this case, the self position estimator 52 estimates the self position using the odometry method on the basis of the distance information output from the distance sensor 2 and the map information (step S111) and the control process flow ends.

In the control process flow, when the information volume determiner 51 determines that (1) peak normal line angles having an orthogonal relationship are not present, (2) plural peak normal line angles are not uniformly present, and (3) the normal line angles are not uniformly distributed, in the calculated histogram (NO in step S105), the self position estimator 52 may not adjust the estimation parameter, but may immediately perform at least one of (A) the control process of changing the measurement direction of the distance sensor 2, (B) the process of changing the estimation method of the self position, and (C) the control process of taking a predetermined safety action.

In step S105, the information volume determiner 51 may determine whether the information of the distance sensor 2 is insufficient by determining (1) whether peak normal line angles having an orthogonal relationship are present in the calculated histogram. Accordingly, it is possible to simplify the determination process and thus to reduce calculation costs. As described above, in the autonomous moving robot 1 according to this embodiment, the information volume determiner 51 calculates the histogram representing the distribution of normal line angles indicating the directions of the normal lines of the planes on the basis of the distances measured by the distance sensor 2. The information volume determiner 51 determines whether the information of the distance sensor 2 for estimating the self position is insufficient on the basis of the calculated histogram. When the information volume determiner 51 determines that the information of the distance sensor 2 is insufficient, at least one of the control process of changing the measurement direction of the distance sensor 2, the process of changing the estimation method of the self position, and the control process of taking a predetermined safety action is performed. Accordingly, when the information of the distance sensor 2 is insufficient, the information volume of the distance sensor 2 is increased by performing the control process of changing the measurement direction of the distance sensor 2 and the influence of an error of the distance sensor 2 is suppressed by changing the estimation method of the self position, whereby it is possible to enhance the estimation accuracy of the self position. It is also possible to improve safety by performing the control process of taking a predetermined safety action.

The invention is not limited to the aforementioned embodiment, but can be appropriately modified without departing from the gist thereof. For example, in the aforementioned embodiment, the distance sensor may be a three-dimensional distance sensor that acquires a three-dimensional measurement point group.

The information volume determiner 51 calculates planes such as wall surfaces on the basis of the three-dimensional measurement point group measured by the three-dimensional distance sensor 2 and calculates the normal lines of the calculated normal lines. The information volume determiner 51 calculates a histogram representing the distribution of normal line angles of the calculated normal lines. The information volume determiner 51 extracts a peak normal line angle from the calculated histogram.

Figure 11:
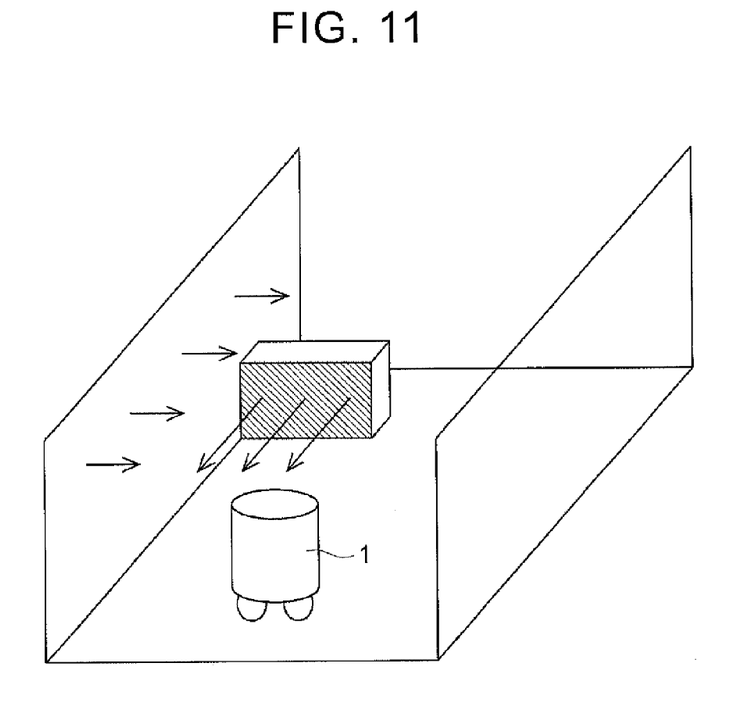
FIG. 11 is a diagram illustrating a case in which control of causing a measurement direction of a distance sensor to face a surface perpendicular to a wall surface is performed.

The information volume determiner 51 determines (1) whether peak normal line angles having an orthogonal relationship are present in the calculated histogram. When the information volume determiner 51 determines that the peak normal line angles having an orthogonal relationship are not present in the calculated histogram, the controller 53 performs (A) the control process of changing the measurement direction of the distance sensor 2. For example, as illustrated in FIG. 11, the controller 53 performs a control process of directing the measurement direction of the distance sensor 2 to the surface (hatched portion) perpendicular to a wall. In the histogram, peak normal line angles having an orthogonal relationship are formed (FIG. 6). Accordingly, the information of the distance sensor 2 becomes sufficient and the self position estimator 52 can estimate the self position with high accuracy.

In the invention, the process flow illustrated in FIG. 10 may be embodied by causing the CPU 5a to execute a computer program.

The program can be provided to a computer in a state in which the program is recorded on various types of non-transitory computer-readable mediums. The non-transitory computer-readable medium includes various types of tangible storage mediums. Examples of the non-transitory computer-readable medium include a magnetic recording medium (such as a flexible disk, a magnetic tape, and a hard disk drive), a magneto-optical recording medium (such as a magneto-optical disk), a CD-ROM (Read Only Memory), a CD-R, a CD-R/W, and a semiconductor memory (such as a mask ROM, a programmable ROM (PROM), an erasable PROM (EPROM), a flash ROM, a random access memory (RAM)).

The program may be provided to a computer using various types of transitory computer-readable mediums. Examples of the transitory computer-readable medium include electrical signals, optical signals, and electromagnetic waves. The transitory computer-readable medium may provide the program to a computer via a wired communication line such as an electrical wire and optical fiber or a wireless communication line.

What is claimed is:

1. An autonomous moving robot comprising:
a distance sensor that measures a distance to an object;
an estimation unit configured to estimate a self position based on the distance measured by the distance sensor and map information indicating a movement environment of the autonomous moving robot;
a normal line calculating unit configured to calculate a plane based on the distance measured by the distance sensor and calculate the normal line of the plane; and
a determination unit configured to calculate a histogram representing a distribution of normal line angles indicating a direction of the normal line calculated by the normal line calculating unit and determine whether information of the distance sensor for estimating the self position is insufficient based on the calculated histogram,
wherein the autonomous moving robot autonomously moves based on the self position estimated by the estimation unit, and
wherein at least one of a control process of changing a measurement direction of the distance sensor, a process of changing an estimation method of the self position, or a control process of taking a predetermined safety action is performed when the determination unit determines that the information of the distance sensor is insufficient.

2. The autonomous moving robot according to claim 1, wherein the determination unit determines that the information of the distance sensor for estimating the self position is insufficient when a frequency peak of the normal line angles having an orthogonal relationship is not present in the calculated histogram, a plurality of frequency peaks of the normal line angles is not uniformly present in the calculated histogram, and the normal line angles are not uniformly distributed in the calculated histogram.

3. The autonomous moving robot according to claim 1, wherein the estimation unit calculates a plurality of estimated position candidates estimated to be the self position based on the distances measured by the distance sensor, estimates the position extracted from the calculated estimated position candidates to be the self position, and increases the number of estimated position candidates in the direction perpendicular to a peak normal line angle in the histogram when the determination unit determines that the information of the distance sensor is insufficient.

4. The autonomous moving robot according to claim 1, wherein at least one of the control process of changing the measurement direction of the distance sensor, the process of changing the estimation method of the self position, and the control process of taking the predetermined safety action is performed when a state in which the determination unit determines that the information of the distance sensor is insufficient is maintained for a predetermined amount of time or more.

5. The autonomous moving robot according to claim 1, further comprising:
a control unit configured to perform the control process of changing the measurement direction of the distance sensor so as to generate a frequency peak of the normal line angles having an orthogonal relationship in the histogram and a control process of taking a predetermined safety action of decelerating and stopping the autonomous moving robot or giving a warning.

6. The autonomous moving robot according to claim 1, further comprising:
a vehicle wheel that allows the autonomous moving robot to move;
a rotation detecting unit that detects rotation information of the vehicle wheel; and
an image acquiring unit that acquires image information around the autonomous moving robot,
wherein the estimation unit estimates the self position based on a first estimation method of estimating the self position using an odometry method based on the distance measured by the distance sensor and the map information and a second estimation method of estimating the self position using the odometry method based on at least one of the rotation information detected by the rotation detecting unit or the image infatuation acquired by the image acquiring unit, and sets a weighting of the second estimation method to be higher than that of the first estimation method when the determination unit determines that the information of the distance sensor is insufficient.

7. A control method of an autonomous moving robot including a distance sensor that measures a distance to an object and an estimation unit configured to estimate a self position based on the distance measured by the distance sensor and map information indicating a movement environment of the autonomous moving robot and autonomously moving based on the self position estimated by the estimation unit, the control method comprising:
calculating a plane based on the distance measured by the distance sensor and calculating a normal line of the plane;
calculating a histogram representing a distribution of normal line angles indicating a direction of the calculated normal line and determining whether information of the distance sensor for estimating the self position is insufficient based on the calculated histogram; and
performing at least one of a control process of changing a measurement direction of the distance sensor, a process of changing an estimation method of the self position, and a control process of taking a predetermined safety action when it is determined that the information of the distance sensor is insufficient.

* * * * *